March 1, 1966   E. TÖNNIES   3,237,893

TRIMMER DEVICE FOR AIRCRAFT

Filed Dec. 23, 1964   3 Sheets-Sheet 1

Eduard Tönnies
INVENTOR.

BY
Mestern, Ross & Mestern

Eduard Tönnies
INVENTOR.

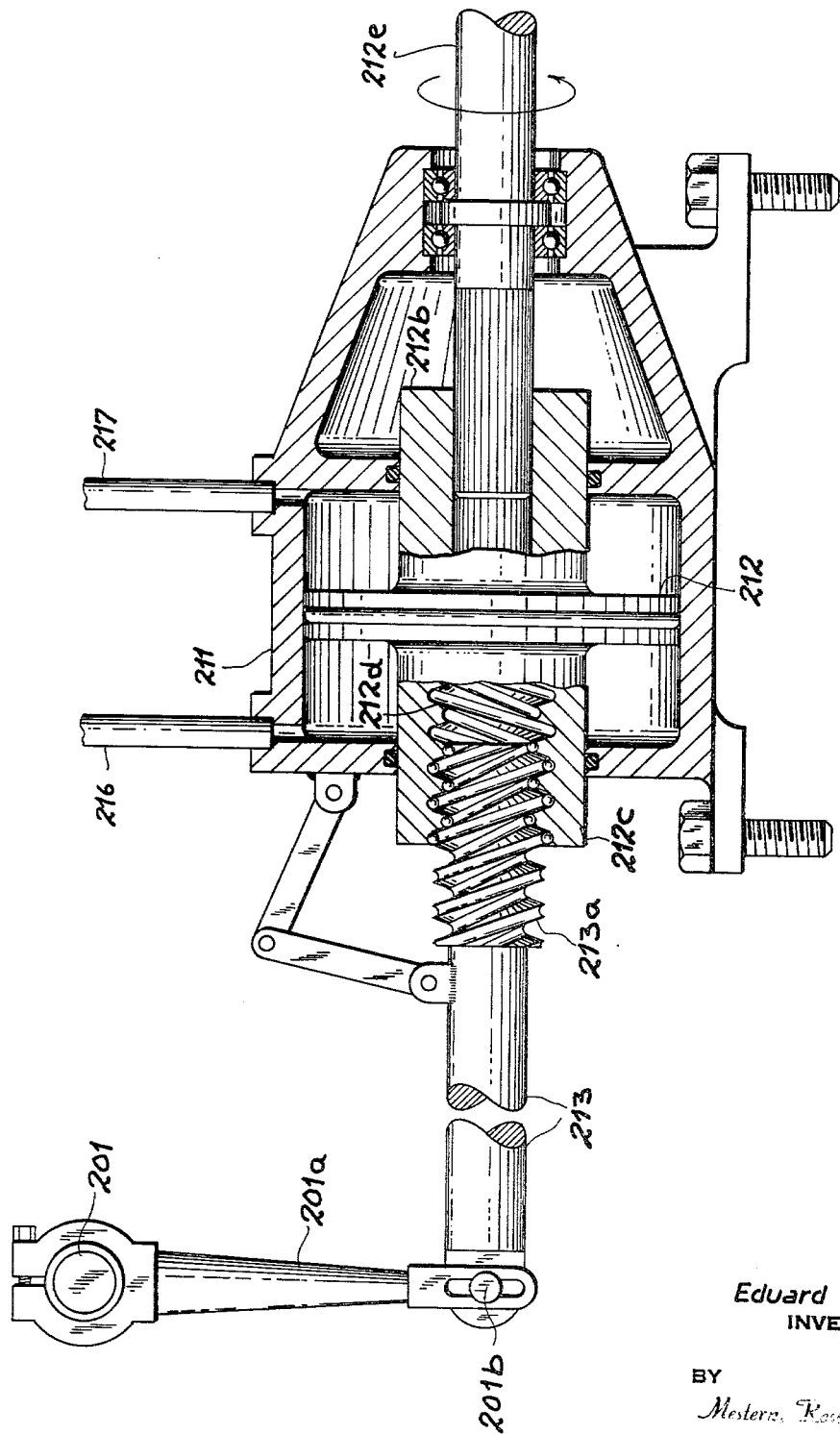

United States Patent Office 3,237,893
Patented Mar. 1, 1966

3,237,893
TRIMMER DEVICE FOR AIRCRAFT
Eduard Tönnies, Hamburg-Rissen, Germany, assignor to Hamburger Flugzeugbau G.m.b.H., Hamburg-Finkenwerder, Germany, a corporation of Germany
Filed Dec. 23, 1964, Ser. No. 420,628
11 Claims. (Cl. 244—78)

My present invention relates to trimming devices for aircraft which are capable of both manual and remote control and, more particularly, to trimmer-tab installations using hydraulic means.

It is common practice in the aeronautical art to provide at the tail of an aircraft, in addition to the usual rudder and stabilizer, a pair of trimmer tabs or flaps e.g. on the stabilizer on opposite sides of the rudder or adjacent the rudder itself, which can be automatically or manually operated to trim the aircraft and compensate for temporary flight disturbances. Automatic control of trimmer flaps has been effected by various means including fuel consumption and means responsive to the stresses and strains encountered by the aircraft during level flight, banking, takeoff and landing. In many cases, however, "manual" means is provided to permit of direct control of the trimmer tabs by the pilot, copilot or flight engineer. Several classes of controls have been employed heretofore for this purpose. Thus, it has been proposed to provide the tabs with electric motors or the like which are alternatively controlled from the cockpit by manually operable switch means or by some sensing means as mentioned above via a remote switching device. In these cases, cables and the like must be provided between the electric motors disposed in the region of the trimmer flaps and the energizing devices at the cockpit, in the engine pods or at an electrical panel of the aircraft. In another arrangement, two distinct and alternately operable systems are provided, one effecting mechanical remote control of the flaps while the other produces an electrical signal to drive the motor associated with the flaps, the motor being coupled by a motion-translating transmission or the like with a mechanical link element. Again, cables are required. The disadvantages of electrical systems involving cables of extended length in aircraft are well known to those skilled in the art and maye be briefly summarized as danger of undetectable short circuit within the cable, severing of the cable under rigors of aircraft flight and possibility of human error in failing to connect the cable. Moreover, electromechanical systems have a high operating inertia as a consequence of the relatively prolonged period required from the moment of energization and the time at which the operation of the electrical motor is effectively translated into the corresponding movement of the trimmer flap. While hydraulic mechanisms have been suggested in place of the electric motors, for the most part, these are incapable of providing relatively rapid response, are incompatible with mechanical systems for operation of the trimmer flaps and are of such complex construction and configuration so as to involve considerable expense and difficulty of installation.

It is, accordingly, an important object of the present invention to provide an improved trimmer device for aircraft wherein the foregoing disadvantages are obviated and which affords rapid response to the trimmer tabs and is relatively simple and inexpensive.

A more specific object of this invention is to provide an installation of the character described wherein remote-control means and manually operable means are compatibly joined to operate the trimmer tabs of an aircraft.

These objects and others, which will become apparent hereinafter, are attained, in accordance with the present invention, by a trimmer-flap-control installation in which a rotatable member is operatively coupled with a trimmer tab in order to provide, via a suitable motion-translating means, a substantially linear movement adapted to operate the trimmer flap, the rotating member being driven in turn by manual and hydraulic means selectively connected with manual and remote actuating elements; one of these elements is an axially displaceable member provided with a screw thread cooperating with the mating thread of a rotatable member constituting the other element. According to an important feature of the present invention, the hydraulic control means includes a piston coaxially aligned with the rotating member and preferably surrounding same while being operatively connected thereto via the screw-thread means. The hydraulic piston is, therefore, axially reciprocable in a cylinder having a pair of opposed working compartments to which hydraulic fluid can be selectively directed via suitable valve means. The threaded interconnection between the piston and the rotating member ensures that there is substantially no backlash or inertia in the transfer of motion and thus no significant lag between actuation of the trimmer tab and the movement of the control element to which the trimmer tab is to respond. Thus, the hydraulic piston may, as is preferred, be coaxially shiftable with no freedom of rotation about its axis while the rotating member passing therethrough and surrounded by the piston is axially fixed, reciprocation of the piston thereby generating a rotation of the member to which the piston is threadedly connected. The pitch of the thread and its general construction should be so as to insure translation of the axial motion of the piston into a rotary movement of the member. For this purpose, the mating screw threads may be provided with ball bearings or the like seated between the root of the male thread and the apex of the female and/or between the generally parallel flanks of the opposing threads to reduce the internal friction of the thread connection. A kinematic reversal is also envisioned, according to this invention, whereby the manually shiftable member is nonrotatable while the rotatable piston member is coaxial with and engages the nonrotatable member.

According to a more specific feature of the present invention, the conduit means or passages connected to the hydraulic cylinder within which the piston is reciprocable, can communicate with a source of fluid under pressure or a reservoir via a three-position valve means. The latter may have two extreme positions wherein the working chambers of the cylinder are alternately connected with the source and the reservoir so that hydraulic fluid urges the piston in one axial direction or the other to rotate the other member in one of its oppositely effective senses to raise or lower the respective trimmer flap or tab. The valve means has, according to this aspect of the invention, a further (intermediate) position in which both of the chambers are connected togther and, possibly, also with the reservoir. In this "neutral" position, the rotating member is exclusively under manual control. For this purpose, the rotating member can be connected via any suitable motion-translating linkage to an actuating element positioned in the cockpit of the aircraft and directly operable by the pilot or one of the other members of the crew. The valve means can be controlled by suitable relay means coupled with a remote sensing means responsive to deviations of the aircraft for normal flight. The control means can include any of the usual relays or the like for operating the electromagnetically controllable valve. Under these circumstances, the remote-control means of the trimmer-tab installation is relatively simple and free from the clutches, linkages and other devices prone to malfunction characterizing conventional systems. Moreover, the linkage between the cockpit and the trimmer tabs can be a hand wheel, e.g. the hand wheel used by the pilot for controlling the rudder and direction of flight, or an additional hand wheel or lever, thereby enabling immediate response to the movement of the actuating element by the pilot.

The above and other objects, features and advantages of the present invention will become more readily apparent from the following description, reference being made to the accompanying drawing in which:

FIG. 4 is a still another cross-sectional view illustrating a further modification.

Figure 1:
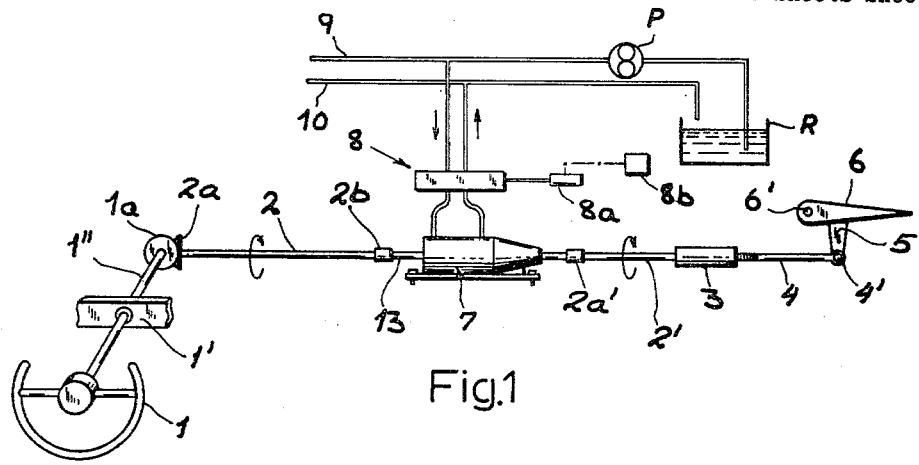
FIG. 1 is a diagrammatic view of a trimmer-tab-control installation according to the present invention.
Figure 2:
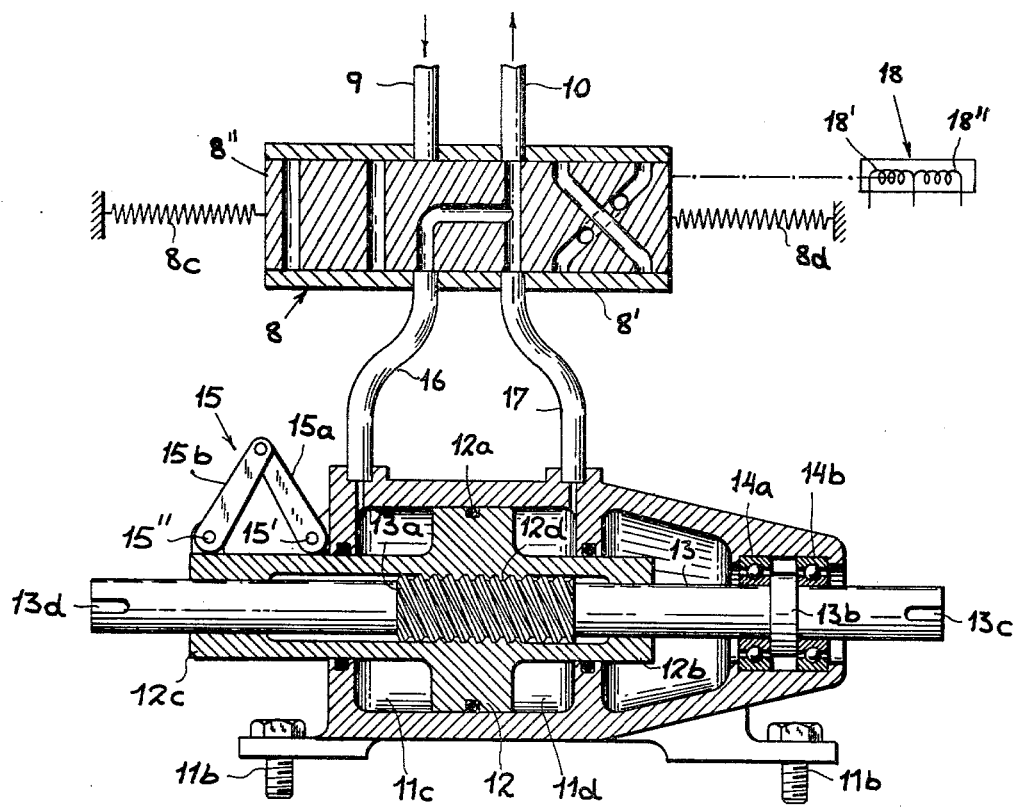
FIG. 2 is an axial cross-sectional view through the coupling device of the installation of FIG. 1 with the hydraulic control means shown partly in diagrammatic form.

In FIG. 1 of the drawing, I have shown an actuating element such as the wheel 1 in the cockpit of an aircraft which is operated by the pilot to raise or lower the trimmer flaps or tabs, only one of which is shown at 6. The wheel 1 is rotatable in a bearing 1' and turns the shaft 1'' whose bevel gear 1a meshes with the bevel gear 2a of the shaft 2. The latter rotatably entrains the rotating member 13 of the coupling represented generally at 7. The rotating member 13 is coupled further via a universal joint, pin, spline or the like to a shaft 2' at a connector shown at 2a' which is similar to that illustrated at 2b (connecting shaft 2 with the rotating member 13). Shaft 2' operates, via a motion-translating device 3, 4, the trimmer tabs 6 which are pivotal about their axes 6'. The motion-translating device can include the threaded sleeve 3 which is rigid with shaft 2' and engages the male thread of a link rod 4 pivotally connected at 4' to the lever 5 of the trimmer tab 6. The coupling means 7 includes a hydraulic motor having an axially shiftable piston as illustrated in any of FIGS. 2–4. The hydraulic motor can be energized via the high-pressure conduit 9 which is connected with the hydraulic pump P drawing pressure from a reservoir R into which the hydraulic line 10 empties. Pump P and reservoir R can be the usual hydraulic network of the aircraft, servicing all other hydraulic and operating components. The valve means, diagrammatically illustrated at 8 and shown in greater detail in FIG. 2, is provided with a solenoid-type two-winding displacing means 8a which can be controlled directly or by a relay 8b or the like responsive to changes in aircraft conditions (e.g. fuel-consumption rate, air resistance, sudden changes in aircraft trim, air speed). The latter control means can be of any conventional type hitherto employed for the automatic operation of the trim tabs.

Referring now to FIG. 2, it may be seen that the hydraulic motor of the coupling system generally designated 7 in FIG. 1 can be constituted by a piston-and-cylinder assembly 11, 12. The cylinder 11 is rigid with the housing 11a which, in turn, is affixed to the aircraft fuselage, air frame or other fixed portion of the craft by bolts 11b. The longitudinally reciprocable piston 12 is provided with annular seal means 12a and subdivides the cylinder 11 into a pair of working chambers 11c, 11d, respectively communicating with hydraulic lines 16 and 17 leading to the three-position valve 8. The piston 12 is formed with a pair of axially extending bosses 12b, 12c coaxially surrounding the rotatable inner member 13 which is threaded at 13a and thus mates with the internal thread 12d of the piston. Antifriction means can be provided in the threaded connection to prevent it from being self-locking, suitable antifriction means being illustrated in FIG. 5. The piston 12 and housing 11, as in the case of all of the nonrotatable but axially shiftable members of the coupling hereinafter described, can be prevented from rotating by a scissor or toggle linkage generally designated 15 and consisting of a first arm 15a pivoted at 15' to the cylinder 11 or the housing 11a and a second arm 15b articulated to the first and pivotally connected at 15'' to the boss 12c of the piston. The other member 13 of the coupling is fixed against axial displacement but is permitted freedom of rotation as described earlier. For this purpose, member 13 is provided with an annular flange or shoulder 13b flanked by a pair of ball bearings 14a, 14b in a forwardly extending portion of housing 11a. Member 13 can be slotted at its extremities 13c and 13d to accommodate the connectors 2a' and 2b previously described.

The valve 8 can be any three-position valve which, in one extreme position, connects the line 16 and 17 respectively with the high-pressure-fluid conduit 9 and the return conduit 10 and, in a second position, interchanges these connections while communicating between the lines 16 and 17 in an intermediate or neutral position. The schematically illustrated valve can thus have a sleeve-like housing 8' within which a valve member 8'' is reciprocable by electromagnet 18, the latter representing the electrical energizing means shown at 8a in FIG. 1. The winding 18' and 18'' of this electromagnetic device are adapted to displace the valve member 8'' against the force of centering springs 8c, 8d either to the right or to the left in response to a control signal from the sensing means. The springs represent any suitable restoring and indexing means for accomplishing the same purpose.

When the valve member 8'' is in its position shown, conduits 16 and 17 are interconnected and both communicate with the reservoir via line 10. No hydraulic force is thus applied to the piston 12 and, upon rotation via the actuating element 1, member 13 transfers rotary movement to the motion-translating means 3 which, in turn, converts this rotary movement into a substantially linear one capable of operating the tabs 6 to raise or lower the latter in accordance with the sense of rotation of member 13. In this position the trimmer tabs are entirely under the control of the pilot. When, however, the valve member 8'' is shifted to the right in response to the remote sensing means, hydraulic fluid under pressure is supplied to conduit 16 and compartment 11c of the cylinder while compartment 11d communicates via conduit 17 with the return conduit 10 and is under reduced pressure. The piston 12 is displaced to the right and rotates the axially fixed member 13 correspondingly. When the valve member 8'' is shifted by the electromagnetic device 18 to the left, hydraulic fluid is supplied under pressure to compartment 11d while chamber 11c is at the low pressure of the reservoir so that piston 12 is shifted axially to the left (FIG. 2) and the member 13 rotated in the opposite direction.

Figure 3:
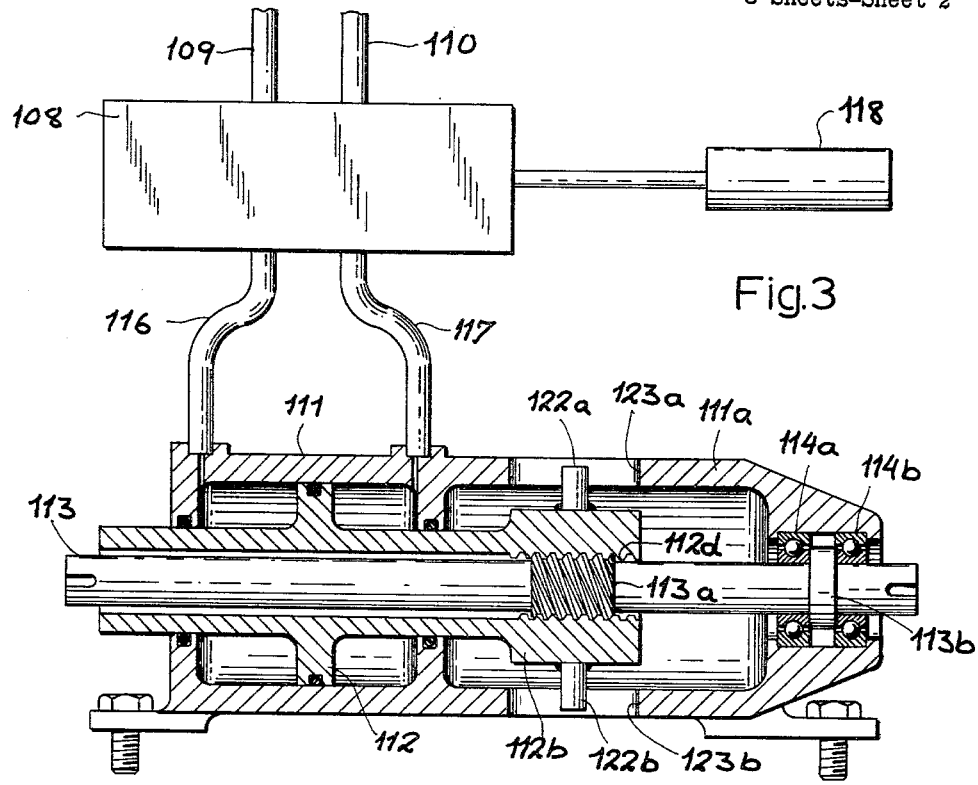
FIG. 3 is a view similar to FIG. 2 of a modified coupling arrangement.

In FIG. 3, I show a modified system wherein the cylinder 111 is again connected in a hydraulic circuit via conduits 116 and 117, the hydraulic valve 108, the high-pressure line 109 and the low-pressure line 110. The electromagnetic means 118 can be similar to that shown at 18 in FIG. 2 while the valve 108 can, accordingly, also be of the three-position type illustrated. In this case, however, the hydraulic piston 112 has its boss 112b axially outwardly of the cylinder 111 formed with the internal thread 112d which mates with the complementary thread 113a of the rotating member 113. The latter is axially fixed with respect to the housing portion 111a by its annular flange 113b flanked by the bearings 114a, 114b. While a scissor or toggle linkage was provided in the system of FIG. 8 for preventing rotation of the piston, the means preventing such rotation in the embodiment of FIG. 3 includes a pair of radially extending pins 122a, 122b at the enlarged portion of boss 112b, the pins being received in respective axially extending slots 123a, 123b in the cylindrical wall of housing portion 111a. The operation of this structure is identical with that previously described.

In the system of FIG. 4, however, there is shown a kinematic reversal whereby the piston 212 is rotatable about its axis and that of member 213. In this case, member 213 is axially shiftable by, for example, a crank 201a by the manually rotated shaft 201 to which the crank 201a is affixed. Member 213 is connected via the crank 201a at a pivot 201b. The piston 212 is axially reciprocable within the housing 211 by hydraulic fluid from the valves and lines described earlier and in an identical manner. The boss 212c of piston 212 is formed with internal thread 212d which is complementary to and matingly receives the male thread 213a of member 213. When the latter member is axially shifted by manual actuation under the control of the pilot, the nonlocking thread causes rotation of the hydraulic piston 212 which can be prevented from axial movement by blocking both of the lines 216, 217 communicating with the hydraulic cylinder. Alternatively, free rotation of the piston can be permitted. In any event, the axial movement of member 213 causes rotation of the piston which, in turn, has its other boss 212b splined to the shaft extension 212e which can be connected in the manner shown at 2a' with the link 2' (FIG. 1). The extension 212e is thus rotated in a manner similar to that of members 13 and 113 previously described. A similar rotation is effected when the hydraulic piston 212 is axially displaced by fluid pressure. Under these circumstances, the threads cause concurrent rotation of the piston, which rotation is transferred to extension 212e via the splines.

Figure 5:
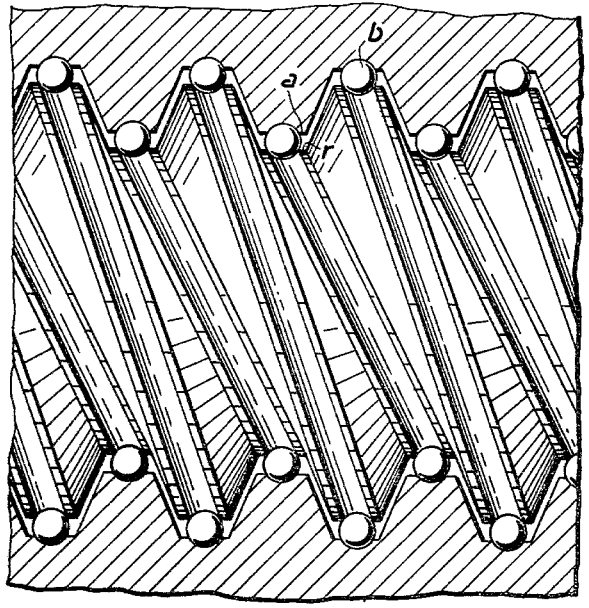
FIG. 5 is an enlarged cross-sectional view of the mating threads of any of the systems of FIGS. 2–4, showing friction-reducing means according to this invention.

As will be apparent from FIG. 5, the threaded interconnection of one of the coupling members described above can be made nonself-locking and of reduced friction by providing bearing means between the root r of the male thread and the apex a of the female thread. Similar bearing means are provided between the apex of the male thread and the root of the female thread, the bearing means being illustrated as balls b spaced apart along the thread. The balls can be introduced by tangential bores penetrating to the space between the threads, the latter being so dimensioned as to accommodate the balls and having a ball-receiving surface suitably convex so as to provide races which automatically center the bearing elements.

What is claimed is:

1. In a trimmer device for aircraft wherein at least one trimmer tab is selectively operable by manual and automatic control movements, the combination with said trimmer tab of: at least one manually operable actuating element; at least one automatically operable actuating element; link means operatively connected with said tab for displacing same in response to movement transmitted to said link means; coupling means interconnecting said elements and said link means for selectively transmitting movement of said elements to said link means, one of said elements constituting a substantially linearly displaceable nonrotatable member, the other of said elements including a rotatable member aligned with said nonrotatable member and threadedly engaging the latter whereby linear movement of said nonrotatable member effects rotation of said rotatable member, said rotatable member being coupled with said link means for rotating same; and hydraulic means at said coupling means for displacing one of said members parallel to the axis of screw threads interconnecting said members.

2. The combination defined in claim 1 wherein said link means includes motion-translating means for translating rotary movement into substantially linear movement for operating said trimmer tab.

3. The combination defined in claim 1 wherein said nonrotatable member is a hydraulic piston, said hydraulic means further comprising a cylinder surrounding said piston and multiposition hydraulic control means for selectively supplying a hydraulic fluid to said cylinder to reciprocate said piston and effect rotation of said link means in accordance with the direction of displacement of said piston.

4. The combination defined in claim 3 wherein said rotatable member extends axially through said piston and emerges therefrom for coupling with said link means, said rotatable member forming said manually operable actuating element and being displaceable by the operator of the aircraft.

5. The combination defined in claim 4, further comprising means for preventing rotation of said nonrotatable member while permitting axial displacement thereof.

6. The combination defined in claim 5 wherein the last-mentioned means includes a pair of articulated arms one of which is pivotally connected with said nonrotatable member while the other is pivotally connected to a fixed portion of the aircraft.

7. The combination in claim 5 wherein the last-mentioned means includes at least one radially extending pin on said nonrotatable member, further comprising housing means at least partially surrounding said nonrotatable member and formed with an axially extending slot slidably receiving said pin.

8. The combination defined in claim 4, further comprising means for fixedly positioning said rotatable member axially while permitting rotation thereof.

9. The combination defined in claim 8 wherein the last-mentioned means includes an annular flange on said rotatable member and bearing means flanking said flange for preventing axial movement thereof.

10. The combination defined in claim 4 wherein said hydraulic control means includes an electromagnetically operable valve having a pair of extreme positions wherein hydraulic fluid is fed under pressure to said cylinder on opposite sides of said piston and an intermediate position wherein no hydraulic fluid is supplied to said cylinder.

11. The combination defined in claim 3 wherein said piston forms said rotatable member and said manually operable actuating element constitutes said nonrotatable member.

No references cited.

MILTON BUCHLER, *Primary Examiner.*